US012772079B2

(12) United States Patent
Srivastava et al.

(10) Patent No.: US 12,772,079 B2
(45) Date of Patent: Oct. 20, 2026

(54) METHOD OF IDENTIFYING ACCESSIBLE NODES AND SYSTEM FOR IMPLEMENTING THE SAME

(71) Applicant: RAKUTEN MOBILE, INC., Tokyo (JP)

(72) Inventors: Akarsh Srivastava, Tokyo (JP); Ryo Watanabe, Tokyo (JP); Sumanmishra Prabhat, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 354 days.

(21) Appl. No.: 18/548,336

(22) PCT Filed: Jul. 20, 2023

(86) PCT No.: PCT/US2023/028213
§ 371 (c)(1),
(2) Date: Aug. 30, 2023

(87) PCT Pub. No.: WO2025/018997
PCT Pub. Date: Jan. 23, 2025

(65) Prior Publication Data
US 2025/0031071 A1 Jan. 23, 2025

(51) Int. Cl.
*H04W 24/04* (2009.01)
*H04W 76/10* (2018.01)

(52) U.S. Cl.
CPC ........... *H04W 24/04* (2013.01); *H04W 76/10* (2018.02)

(58) Field of Classification Search
CPC .............................. H04W 24/04; H04W 76/10
See application file for complete search history.

(56) References Cited

U.S. PATENT DOCUMENTS 11,616,711 B1 * 3/2023 Cakulev .............. H04L 41/5058 709/224
11,985,174 B2 * 5/2024 Albasheir ........... H04L 67/1008
2021/0136558 A1 5/2021 Taft et al.
2021/0306875 A1 * 9/2021 Zhang ................... H04W 24/02
2023/0164110 A1 5/2023 Goel
2024/0031910 A1 * 1/2024 Kasi ........................ H04W 8/26

FOREIGN PATENT DOCUMENTS

CN 115268785 A * 11/2022 .......... G06F 11/2041

OTHER PUBLICATIONS

International Search Report and Written Opinion in PCT Application No. PCT/US2023/028213, mailed Apr. 9, 2024, 10pp.

* cited by examiner

*Primary Examiner* — Michael A Keller
(74) *Attorney, Agent, or Firm* — HAUPTMAN HAM, LLP

(57) ABSTRACT

A method of identifying accessible nodes for a wireless network includes storing a first list of nodes in a first device, wherein the first list includes a corresponding status of each of the nodes in the first list, and the first device usable in a first technology generation of the wireless network. The method further includes updating a second list of nodes in a second device based on the first list of nodes, wherein the second list is free of a status of each of the nodes of the second list, and the second device is usable in a second technology generation of the wireless network different from the first technology generation. The method further includes providing connection information for a node of the second list of nodes to user equipment in response to receiving a connection request from the user equipment.

20 Claims, 6 Drawing Sheets

METHOD OF IDENTIFYING ACCESSIBLE NODES AND SYSTEM FOR IMPLEMENTING THE SAME

RELATED APPLICATIONS

The present application is a National Phase of International Application No. PCT/US2023/028213, filed Jul. 20, 2023.

TECHNICAL FIELD

This description relates to a method of identifying accessible nodes for a wireless network and a system for implementing the method.

BACKGROUND

As technology advances for a wireless network, such as radio access network (RAN), new generations of network equipment are developed. In some instances, user equipment (UE), such as mobile phones or other mobile devices, is not capable of interacting with a most recently developed generation of network equipment. In some instances, a UE is directed to connect to a specific generation of network equipment based on a subscription level of a user or other criteria. In some instances, network equipment from multiple generations is utilized in a same base station, data center, or cluster to provide connectivity for the UE.

In order to provide connectivity for the UE to the wireless network, the base station, data center, or cluster connects the UE to one or more nodes. The nodes in turn provide connection to services of the network. While some generations of network equipment update a status of nodes based on availability to connect the UE to the nodes, a risk exists that network equipment that does not include automatically update node status information will experience difficulties in connecting the UE to the network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
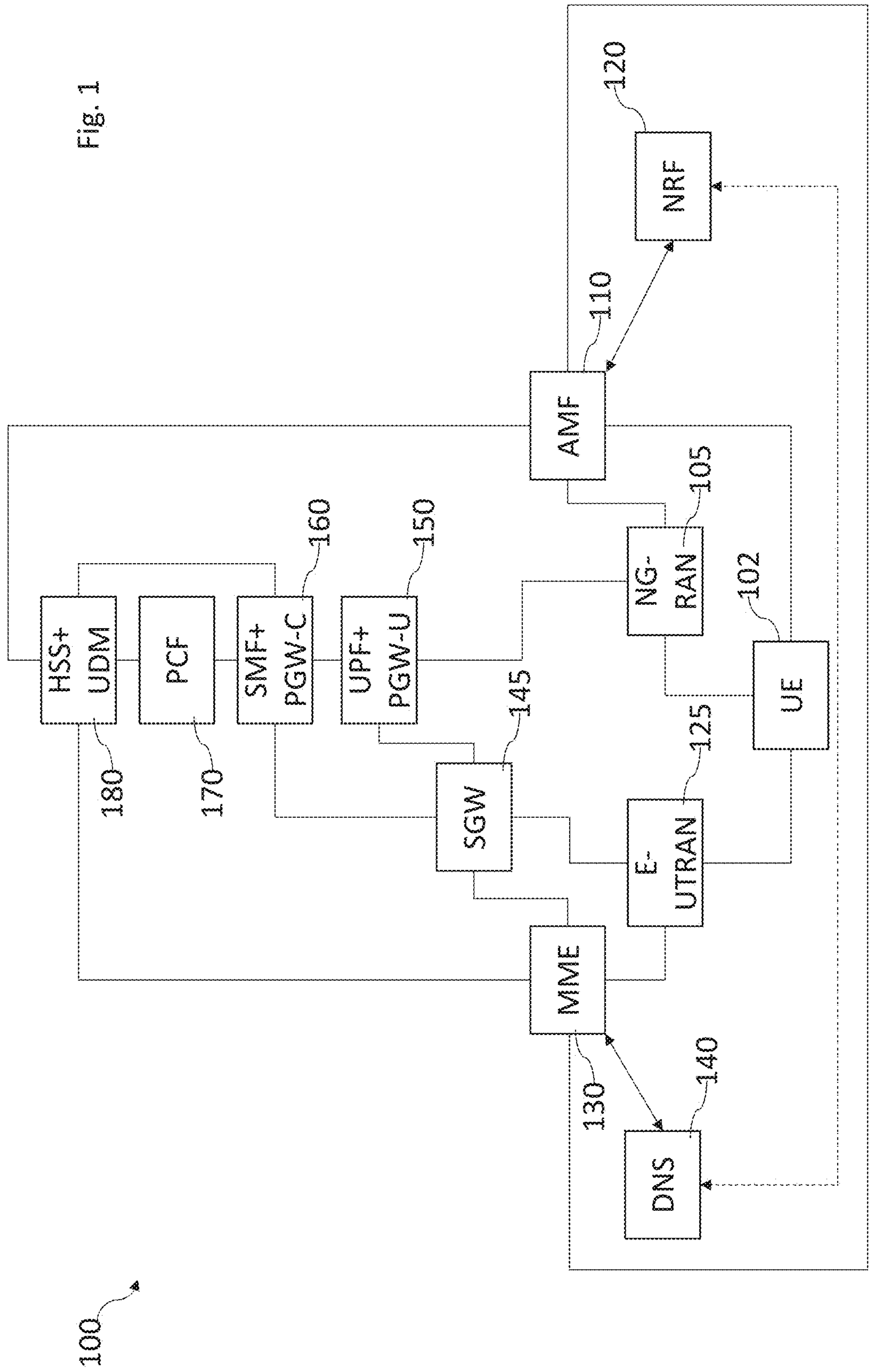
FIG. 1 is a schematic diagram of an architecture multi-generation network equipment in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The rapid development of radio access networks (RAN) has resulted in an increasing number of network equipment being utilized to support different generations of networks. In order to increase efficient use of structures, such as cell towers, and to provide access for user equipment (UE) of varying capabilities, network equipment from different generations is often used in combination. In some embodiments, functionality of network equipment from different generations is integrated into a single device. In some embodiments, the network equipment is maintained as separate devices having different functionality for different generations of network equipment.

In some instances, a UE, such as a mobile phone or another mobile device, is able to utilize the functionality of network equipment across multiple generations. However, in some instances, the UE is limited in the utilization of functionality across multiple generations. For example, in some instances, hardware of the UE lacks the capability to communicate with network equipment for more recently developed generations, such as fifth generation (5G) or sixth generation (6G). In some instances, a service contract associated with the UE limits the ability of the UE to utilize the functionality of network equipment for more recent generations. For example, the user that operates the UE is offered a lower fee for a service contract that utilizes older generation network equipment.

As the UE seeks to access the network, the UE establishes contact with network equipment for a specific generation. The network equipment exchanges information with the UE in order connect the UE to a node that will permit the UE to access services of the network. Services include data services, voice services, text services and the like, in accordance with some embodiments. In some instances, a fault occurs in a node which prevents the UE from properly connecting with the node. However, if the status of the node is not automatically updated by the network equipment, the network equipment will continue to attempt to connect the UE to the faulty node, in some instances. In some embodiments, the node includes one of a registered status, meaning that the node is able to be discovered and able to connect with UE; a suspended status, meaning that the node is able to be discovered but is unable to connect with the UE; or an undiscoverable status, meaning that the node is unable to be discovered. The UE is only able to properly connect with a node in the registered status, in some embodiments. Therefore, an attempt to connect the UE to a node in the suspended or undiscoverable status reduces a likelihood that the UE will be properly connected to the network or that the connection with the network will be unreliable. A user that operates the UE which is unable to effectively connect to the network because of a faulty node, is likely to experience an increase in dissatisfaction with the service of the network.

In addition, some newer generation network equipment is able to automatically update node status to reduce the risk of attempting to connect the UE to a faulty node. In such a situation, different UEs that have different connection capabilities have an increased risk of different service experiences for a same base station, data center, or cluster. Such a situation is likely to exacerbate the dissatisfaction of the user of a UE that is unable to effectively connect to the network. This description provides a method for network equipment that provides functionality for different generations to communicate in order to improve a likelihood of effective connection for a UE to the network regardless of whether the UE is capable of connecting to more recent generation network equipment. The ability to automatically update node status, as described below, will help to improve user satisfaction with the network because the UE operated by the user is more likely to efficiently connect to the network. The description below is based on an example of a combined fourth generation (4G) and 5G architecture. However, one of ordinary skill in the art would recognize that the current description is not limited to solely this combination of network equipment.

FIG. 1 is a schematic diagram of an architecture multi-generation network equipment 100 in accordance with some embodiments. The multi-generation network equipment 100 is configured to permit user equipment (UE) 102 to connect to a node in order to access services of a wireless network. The multi-generation network equipment 100 includes devices for implementing 4G and 5G functionality. One of ordinary skill in the art would recognize that the use of 4G and 5G is merely exemplary and this is not a limitation on the current description. In some embodiments, the UE 102 includes a mobile phone or another suitable mobile device capable of accessing a wireless network. In some embodiments, the functionality components of the multi-generation network equipment 100 is implemented using separate devices which are capable of communicating together. In some embodiments, at least one functionality component is integrated with another functionality component of the multi-generation network equipment 100 into a single device which is capable of communicating with other components of the multi-generation network equipment 100. An anchor point for the multi-generation network equipment 100 includes SMF+PGW-C 160. This device provides connection between the UE 102 and services of the network, such as data transfer, voice, texting, or other suitable services. While the multi-generation network equipment 100 in FIG. 1 includes a single SMF+PGW-C 160, one of ordinary skill in the art would recognize that multiple nodes are usable in a same architecture in order to provide connection capabilities for a higher number of UEs 102.

The multi-generation network equipment 100 includes a next-generation radio access network (NG-RAN) 105 configured to facilitate connection between the UE 102 and a node using 5G technology. The NG-RAN 105 helps manage radio resources and controls radio bearers for establishing communication with the UE 102.

The multi-generation network equipment 100 further includes an access and mobility management function (AMF) 110. The AMF 110 is configured to establish an N2 interface with the NG-RAN 105. The AMF 110 is configured to handle a non-access stratum (NAS) message from the UE 102 in order to establish, maintain, or release connection between the UE 102 and the network. Additional functionality of the AMF 110 is discussed below with respect to interfacing with a network repository function (NRF) 120.

The multi-generation network equipment 100 further includes the NRF 120. The NRF 120 is configured to permit the AMF 110 to discover what nodes, such as SMF+PGW-C 160, are available for connecting to the UE 102. The NRF 120 maintains a list of nodes based on network function (NF) registration data. In some embodiments, the NRF 120 is configured to automatically notify the AMF 110 in response to a change in status of one of the nodes. In some embodiments, the NRF 120 is configured to communicate with the AMF 110 using a third generation partnership project (3GPP) protocol.

The multi-generation network equipment 100 further includes an evolved universal terrestrial radio access (E-UTRAN) 125. The E-UTRAN 125 is configured to facilitate connection between the UE 102 and a node using 4G technology. The E-UTRAN 125 helps manage radio resources and controls radio bearers for establishing communication with the UE 102.

The multi-generation network equipment 100 further includes mobility management entity (MME) 130. The MME 130 is configured to establish an S1-MME interface with the E-UTRAN 125. The MME 130 is configured to manage the UE 102 in order to establish, maintain, or release connection between the UE 102 and the network. The MME 130 is further configured to establish an N26 with the AMF 110 for exchanging management services between the 4G network and the 5G network. Additional functionality of the MME 125 is discussed below with respect to interfacing with a domain name system (DNS) 140.

The multi-generation network equipment 100 further includes the DNS 140. The DNS 140 is configured to permit the MME 130 to discover what nodes, such as SMF+PGW-C 160, are available for connecting to the UE 102. Unlike the NRF 120, the DNS 140 only maintains a list of nodes without including information related to a status of the nodes. In some embodiments, the DNS 140 is configured to communicate with the MME 130 using a 3GPP protocol.

The multi-generation network equipment 100 further includes a severing gateway (SGW) 145. The SGW 145 helps with routing and forwarding of data packets between the UE 102 and the network. The SGW 145 is configured to S1-U from the E-UTRAN 125 for switching the UE 102 between nodes during a handover process. The SGW 145 is also configured to establish an S11 interface with the MME 130 to manage data sessions of the UE 102 connected to the network.

The multi-generation network equipment 100 further includes an integrated user plane function and packet data network gateway-user plane (UPF+PGW-U) 150. The UPF+PGW-U 150 is configured to connect data over the network to the Internet. The UPF+PGW-U 150 is configured to establish an S5-U interface with the SGW 145 for providing Internet Protocol (IP) services to the UE 102. The UPF+PGW-U 150 is configured to establish an N3 interface with the NG-RAN 105 for switching the UE 102 between nodes during a handover process.

The multi-generation network equipment 100 further includes an integrated session management function and packet data network gateway-control plane (SMF+PGW-C) 160. The SMF+PGW-C 160 is configured to relay session related messages between devices in the network. The SMF+PGW-C 160 is also configured to allocate IP addresses and establish, modified and release connections between the UE 102 and the network. The SMF+PGW-C 160 is configured to establish an N4 interface with the UPF+PGW-U 140 for session management including traffic steering and event reporting. The SMF+PGW-C 160 is configured to establish an S5-C interface with the SGW 145 for providing IP services to the control plane. The SMF+PGW-C 160 is further configured to establish an N10 interface with the HSS+UDM 180 for managing connection sessions for the UE 102. The SMF+PGW-C 160 is configured to establish an N11 interface with the AMF 110 for trigger adding, modifying or deleting data sessions during a connection between the UE 102 and the network.

The multi-generation network equipment 100 further includes an integrated policy control function (PCF) 170. The PCF 170 is configured to establish and maintain rules for data flow through the network. The PCF 170 is configured to establish an N7 interface with the SMF+PGW-C 160 for establishing, maintaining and updating policies for data flow. The PCF 170 is configured to establish an N15 interface with the AMF 110 for controlling policy of data flow to the UE 102.

The multi-generation network equipment 100 further includes an integrated home subscriber server and unified data management (HSS+UDM) 180. The HSS+UDM 180 is configured to store subscriber related information such as authentication information and a list of available services. The HSS+UDM 180 is configured to establish an S6a interface with the MME 130 for accessing user authentication, location and subscription information. The HSS+UDM 180 is configured to establish an N8 interface with the AMF 110 for accessing user data stored in the HSS+UDM 180.

During operation, the multi-generation network equipment 100 is configured to capture node status information using the NRF 120. The NFR 120 120 is able to communicate the node status information to the AMF 110 to allow the AMF 110 to reliably connect the UE 102 to the node to allow the UE 102 to access the network. The DNS 140 only maintains a list of nodes without corresponding information related to a status of the node. In a situation where the node is experiencing a fault, the node will continue to appear in the list of nodes in the DNS 140 in other approaches. However, in some embodiments, in the multi-generation network equipment 100, the NRF 120 is capable to communicating with the DNS 140 in order to update the list of nodes in the DNS 140 to include only nodes that are in an accessible status. In some embodiments, the NRF 120 is capable of communication with the DNS 140 in order to generate and update a preclusion list that includes a list of faulty nodes. That is, through the communication between the DNS 140 and the NRF 120, the DNS 140 is able to maintain one or more lists that allow the DNS 140 to accurately inform the MME 130 of the nodes available for connection. As a result, in comparison with other approaches, the multi-generation network equipment 100 is able to reduce or eliminate the risk that the MME 130 attempts to connect the UE 102 to a faulty node. As a result, a reliability of connection between the UE 102 and the network increases resulting in improved customer satisfaction with the network.

Figure 2:
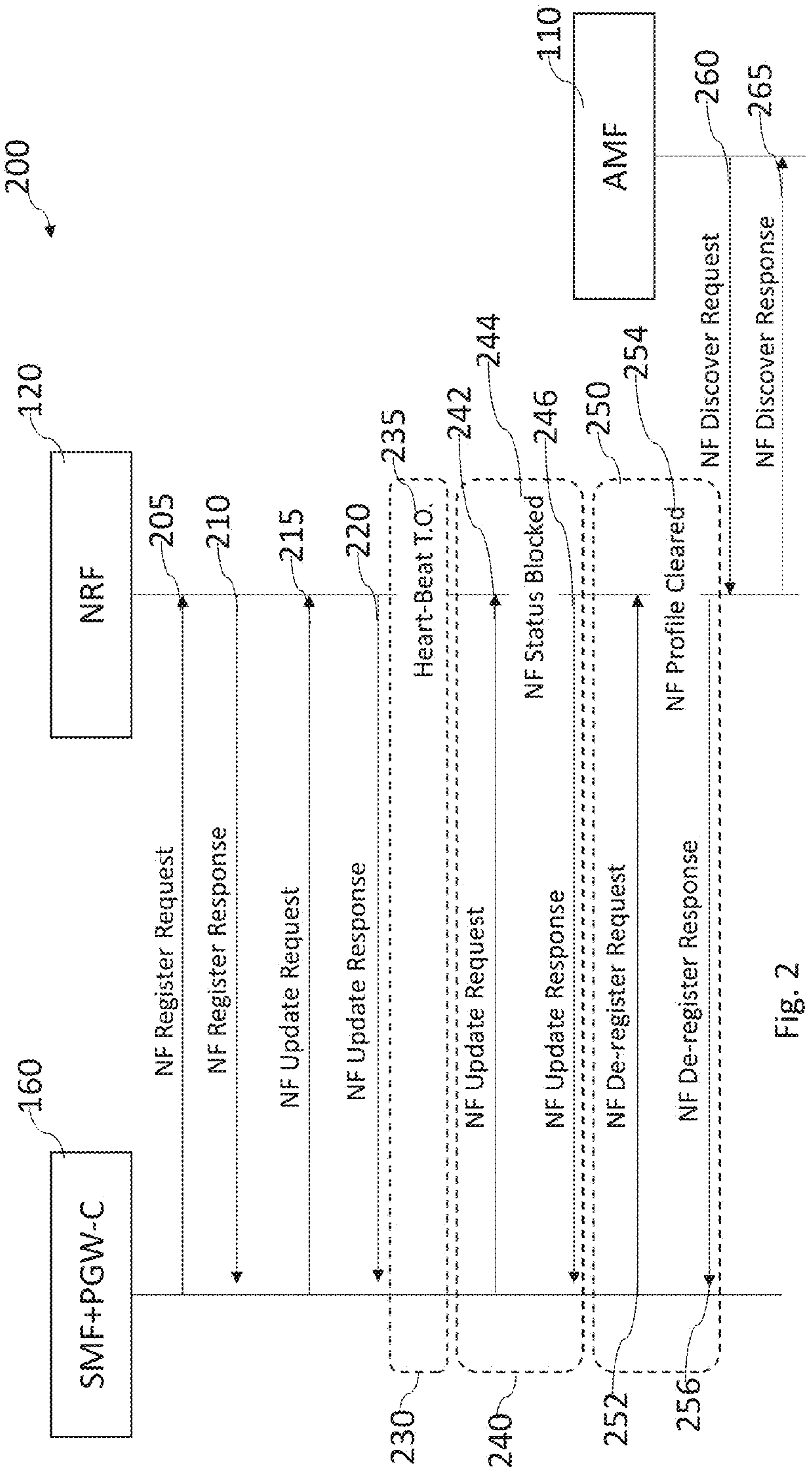
FIG. 2 is a sequence diagram of communication between components of a multi-generation network equipment in accordance with some embodiments.

FIG. 2 is a sequence diagram of communication 200 between components of a multi-generation network equipment in accordance with some embodiments. The communication 200 is between the SMF+PGW-C 160 and the NRF 120 as well as between the NRF 120 and the AMF 110. While the reference numbers refer to components of the multi-generation network equipment 100 (FIG. 1), one of ordinary skill in the art would understand that features of the communication 200 are not limited to solely to the multi-generation network equipment 100 (FIG. 1). The communication 200 includes several scenarios 230, 240 and 250. Each of the scenarios 230 and 240 indicates a situation where a node is identified as being faulty. The scenario 250 indicates a situation where the profile of a node is removed from the NRF 120. In the non-limiting example of the communication 200, the SMF+PGW-C 160 is an anchor point of the network and is treated as the node. In some embodiments, the messages of the communication 200 are transmitted via a wired connection. In some embodiments, at least one message of the communication 200 is transmitted wirelessly.

In message 205, the SMF+PGW-C 160 transmits a network function (NF) registration request to the NRF 120. The NF register request is used to register the node in the NRF 120 so that the node would be discoverable by the AMF 110 for use in connecting a UE, e.g., UE 102 (FIG. 1), to the network. In some embodiments, the message 205 includes information about a functionality of the node as well as identifying information about the node to allow the NRF 120 to provide address and functionality information to the AMF 110 later in communication 200. In some embodiments, the message 205 is transmitted automatically by the SMF+PGW-C 160 in response to the node being added to a base station, a data center, or a cluster. In some embodiments, the message 205 is transmitted in response to the SMF+PGW-C 160 receiving an instruction from a network operator.

In message 210, the NRF 120 transmits an NF register response to the SMF+PGW-C 160. The NF register response informs the SMF+PGW-C 160 regarding whether the node was properly registered in the NRF 120. In some embodiments, the message 210 includes acknowledgement of the request as well as an indication of successful registration. In some embodiments where the registration was unsuccessful, the message 210 includes information, such as an error code, which indicates a reason why the registration of the node failed.

In message 215, the SMF+PGW-C 160 transmits an NF update request to the NRF 120. The NF update request provides updated information about the node to the NRF 120. In some embodiments, the updated information includes information related to a functionality of the node. In some embodiments, the updated information includes information related to an updated address of the node. In some embodiments, the updated information includes information related to an updated status of the node. In some embodiments, the message 215 is transmitted automatically by the SMF+PGW-C 160 in response to the node being rebooted, updated, being re-located within a hierarchy of the network, or other suitable changes to the node. In some embodiments, the message 215 is transmitted in response to the SMF+PGW-C 160 receiving an instruction from the network operator.

In message 220, the NRF 120 transmits an NF update response to the SMF+PGW-C 160. The NF update response informs the SMF+PGW-C 160 regarding whether information about the node was properly updated in the NRF 120. In some embodiments, the message 220 includes acknowledgement of the request as well as an indication of successful update. In some embodiments where the update was unsuccessful, the message 220 includes information, such as an error code, which indicates a reason why the update of the node failed.

In scenario 230, the NRF 120 determines that a heartbeat time out (T.O.) 235 of a node has occurred. That is, the node fails to provide a scheduled heartbeat to the NRF 120. A heartbeat is used to indicate that the node is functioning properly. In some embodiments, a predetermined interval for the node to provide the heartbeat is determined based on the message 205 or the message 215. In some embodiments, the predetermined interval for the node to provide the heartbeat is determined by the NRF 120 and is assigned to the node at a time of registering or at a time of updating of node information; and the node is notified of the interval using message 210 or message 220. The heartbeat T.O. 235 is determined in response to the NRF 120 failing to receive the heartbeat signal from the node within the predetermined interval. In such a situation, the node is determined to be faulty and the status of the node is updated in the NRF 120 to indicate that the node should be communicated to the AMF 110 for connection to a UE. In some embodiments, the status of the node is changed to suspended in response to determining the heartbeat T.O. 235. In some embodiments, the node remains in a faulty status until the NRF 120 receives a heartbeat from the node. In some embodiments, the node remains in faulty status until the NRF 120 receives updated information for the node, e.g., using message 215. In some embodiments, the node remains in faulty status until the NRF 120 receives a new registration request from the node, e.g., using message 210.

In scenario 240, the NRF 120 receives an update request that indicates that the node is blocked. In message 242, the SMF+PGW-C 160 transmits an NF update request to the NRF 120. Similar to the message 215, the NF update request provides updated information about the node to the NRF 120. In the case of message 242, the updated status of the node is indicated as being blocked. That is, the node is currently unable to facilitate connection between the UE, e.g., the UE 102 (FIG. 1), and the network. In some embodiments, the message 242 is transmitted automatically by the SMF+PGW-C 160 in response to the node losing power, having a software failure or other suitable changes to the node. In some embodiments, the message 242 is transmitted in response to the SMF+PGW-C 160 receiving an instruction from a network operator.

In response to receiving the message 242, in operation 244, the NRF 120 updates the status of the node to be faulty. In some embodiments, the status of the node is updated to suspended or undiscoverable.

In message 246, the NRF 120 transmits an NF update response to the SMF+PGW-C 160. The NF update response informs the SMF+PGW-C 160 regarding whether information about the node was properly updated in the NRF 120. In some embodiments, the message 246 includes acknowledgement of the request as well as an indication of successful update. In some embodiments where the update was unsuccessful, the message 246 includes information, such as an error code, which indicates a reason why the update of the node failed. In some embodiments, the message 246 further includes information indicating an updated status of the node in the NRF 120.

In scenario 250, the NRF 120 receives a de-register request that indicates that the node should be removed from the NRF 120 list of available nodes. In message 252, the SMF+PGW-C 160 transmits an NF de-register request to the NRF 120. The NF de-register request includes information for removing the node from the NRF 120. In some embodiments, the message 252 is transmitted in response to replacement of the hardware associated with the node. In some embodiments, the message 252 is transmitted in response to assigning the functionality of the node to another purpose.

In response to receiving the message 252, in operation 254, the NRF 120 removes the node from the list of possible nodes for receiving a connection from a UE, such as UE 102 (FIG. 1). In contrast to the operation 244, which in the status of the node is updated to prevent attempts to connect to the node, the operation 254 completely removes the node from the NRF 120 as being an option for connection to the UE. In some embodiments, the message 252 is transmitted automatically by the SMF+PGW-C 160 in response to the node being removed from the network, re-assigned within the network or other suitable changes to the node. In some embodiments, the message 252 is transmitted in response to the SMF+PGW-C 160 receiving an instruction from a network operator.

In message 256, the NRF 120 transmits an NF de-register response to the SMF+PGW-C 160. The NF de-register response informs the SMF+PGW-C 160 regarding whether the node was properly removed from the NRF 120. In some embodiments, the message 256 includes acknowledgement of the request as well as an indication of successful de-registration. In some embodiments where the de-registration was unsuccessful, the message 256 includes information, such as an error code, which indicates a reason why the de-registration of the node failed.

One of ordinary skill in the art would understand that the scenarios 230, 240 and 250 are not all required to occur. In some embodiments, none of the scenarios 230, 240 or 250 occur. The various scenarios 230, 240 and 250 are shown in a single communication 200 for brevity and for ease of understanding of some instances for changing the status of a node in the NRF 120 and/or removing a registered node from the NRF 120. Utilizing the registration, update, as well as the possible occurrence of any of the scenarios 230, 240 and 250, the NRF 120 is able to generate and maintain a list of available nodes for connection to a UE, such as UE 102 (FIG. 1), and a status of each of the nodes for allowing the AMF 110 to attempt to connect the UE to the node.

In message 260, the AMF 110 transmits an NF discover request to the NRF 120. The NF discover request requests information from the NRF 120 related to which nodes are within the network and the status of each of the nodes. In some embodiments, the message 260 is transmitted automatically in response to the AMF 110 receiving a connection request from a UE, such as UE 102 (FIG. 1). In some embodiments, the message 260 is transmitted periodically to allow the AMF 110 to maintain an up to date listing of available nodes to facilitate faster connection of UEs in a future connection request. In some embodiments, the message 260 is transmitted in response to the AMF 110 receiving an instruction from the network operator, such as in response to hardware or software updates to a base station, a data center, or a cluster; restoration of power to a base station, a data center, or a cluster; or other suitable occurrences.

In message 265, the NRF 120 transmits an NF discover response to the AMF 110. The NF discover response informs the AMF 110 regarding which nodes are available and the current status of each of the nodes stored in the NRF 120. In some embodiments, the message 265 includes acknowledgement of the request as well as the node information. In some embodiments where the discover request was unsuccessful, the message 265 includes information, such as an error code, which indicates a reason why the discover request failed.

Utilizing the communication 200, the AMF 110 is able to accurately and precisely determine which nodes are available to be assigned to the UE, such as UE 102 (FIG. 1). This allows the AMF 110 to provide accurate data to the UE for connecting to the network. The improved accuracy of the data provided to the UE increases the odds of the UE successfully and reliably connecting to the network; and helps to maintain user satisfaction with the network.

Figure 3:
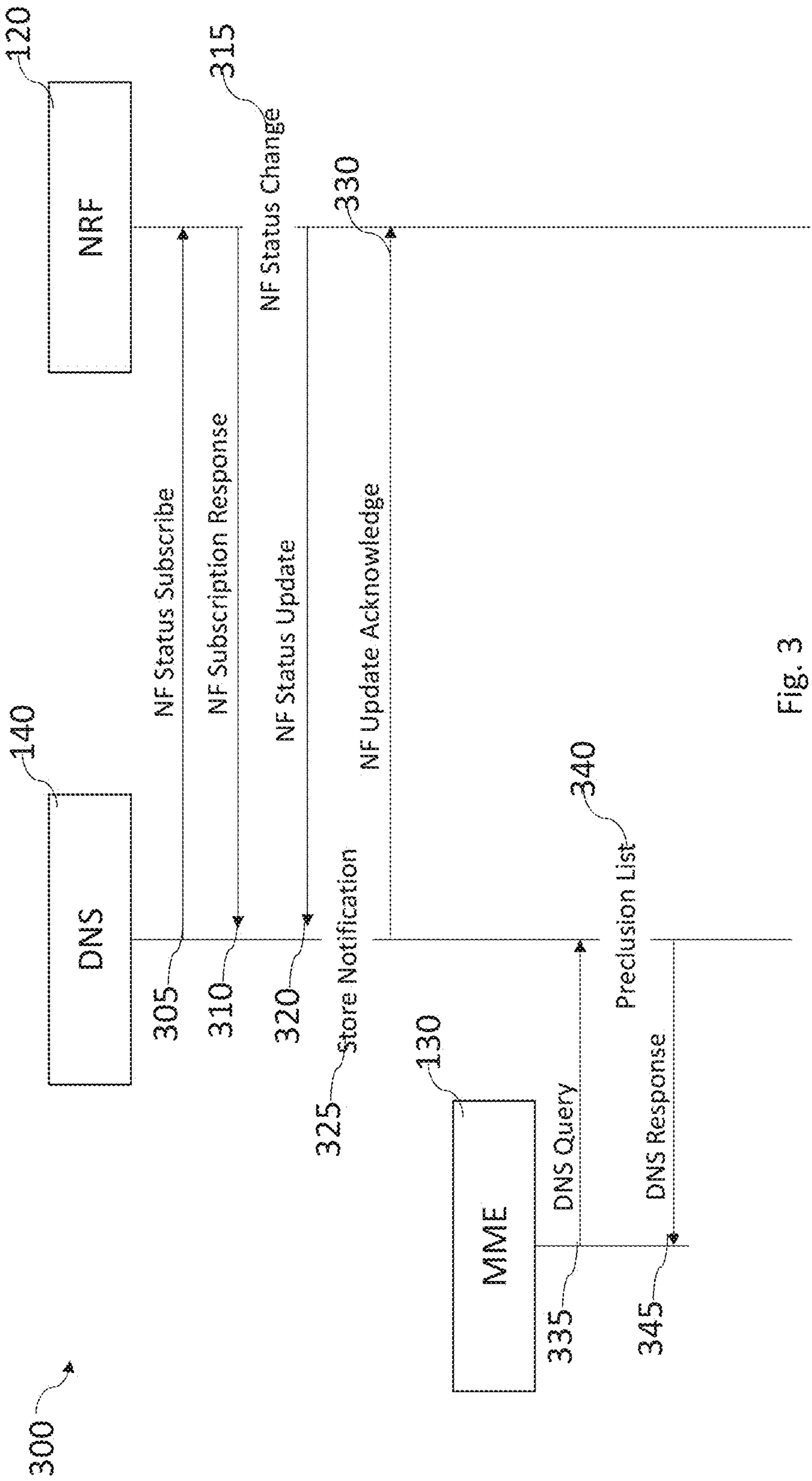
FIG. 3 is a sequence diagram of communication between components of a multi-generation network equipment in accordance with some embodiments.

FIG. 3 is a sequence diagram of communication 300 between components of a multi-generation network equipment in accordance with some embodiments. The communication 300 is between the DNS 140 and the NRF 120 as well as between the DNS 140 and the MME 130. While the reference numbers refer to components of the multi-generation network equipment 100 (FIG. 1), one of ordinary skill in the art would understand that features of the communication 300 are not limited to solely to the multi-generation network equipment 100 (FIG. 1). In some embodiments, the messages of the communication 300 are transmitted via a wired connection. In some embodiments, at least one message of the communication 300 is transmitted wirelessly.

In message 305, the DNS 140 transmits NF status subscription to the NRF 120. The NF status subscription is used to register the DNS 140 with the NRF 120 so that the NRF 120 will notify the DNS 140 in response to changes in availability of nodes within the network. Availability of nodes within the network changes based on registration of nodes, de-registration of nodes, changes of status of nodes, or other suitable occurrences. In some embodiments, the message 305 includes a request for periodic updates regardless of a change in status of nodes in order to help the DNS 140 maintain an accurate listing of available nodes. In some embodiments, the message 305 is transmitted automatically by the DNS 140 in response to the DNS 140 being added to a base station, a data center, or a cluster. In some embodiments, the message 305 is transmitted in response to the DNS 140 receiving an instruction from the network operator.

In message 310, the NRF 120 transmits an NF subscription response to the DNS 140. The NF subscription response informs the DNS 140 regarding whether the DNS 140 was properly subscribed to the information in the NRF 120. In some embodiments, the message 310 includes acknowledgement of the request as well as an indication of successful subscription. In some embodiments where the subscription was unsuccessful, the message 310 includes information, such as an error code, which indicates a reason why the subscription of the DNS 140 failed.

In operation 315, an NF status change of at least one node in the list of nodes in the NRF 120 changes. In some embodiments, the status of at least one node changes as a result of one or more of the scenarios 230, 240 and 250 (FIG. 2). In some embodiments, the status of at least one node changes as a result of a new node being registered in the NRF 120.

In response to the NF status change 235, a message 320 is transmitted from the NRF 120 to the DNS 140. The NF status update provides updated information about the nodes stored in the NRF 120. In some embodiments, the updated information includes information related to a functionality of the node. In some embodiments, the updated information includes information related to an updated address of the node. In some embodiments, the updated information includes information related to an updated status of the node. In some embodiments, the message 320 is transmitted automatically by the NRF 120 in response to the operation 315. In some embodiments, the message 320 is transmitted in response to the NRF 120 receiving an instruction from the network operator.

In operation 325, the notification from the message 320 is stored in the DNS 140. In some embodiments, the DNS 140 stores a list of accessible nodes; and the list is updated based on information received in the message 320. Through the updated list of available nodes, the DNS 140 is able to accurately inform the MME 130 of the nodes available for connecting to the UE, e.g., the UE 102 (FIG. 1). In some embodiments, the DNS 140 stores a list of nodes connected to the network; and a preclusion list of nodes that are in a faulty status is updated in response to the message 320. Through the combination of the list and the preclusion list, the DNS 140 is able to accurately inform the MME 130 regarding which nodes are currently available for connecting to the UE, e.g., the UE 102 (FIG. 1). As discussed above, unlike the NRF 120, the DNS 140 only stores a list of nodes not a status of the nodes. Therefore, in some embodiments, in the operation 325, the list of the available nodes in the DNS 140 is updated to remove any nodes that are faulty, e.g., nodes that have a suspended status or an undiscoverable status. Alternatively, in some embodiments, in the operation 325, the list of the precluded nodes in the DNS 140 is updated to include any nodes that are faulty, e.g., nodes that have a suspended status or an undiscoverable status. By updating the list of available nodes and/or the list of precluded nodes, the DNS 140 has a reduced risk of providing the MME 130 with a potential connection node that is currently incapable of connecting to the UE, such as UE 102 (FIG. 1).

In message 330, the DNS 140 transmits an NF update acknowledgement to the NRF 120. The NF update acknowledgement informs the NRF 120 regarding whether information about the node was properly stored in the DNS 140. In some embodiments, the message 330 includes acknowledgement of the request as well as an indication of successful update. In some embodiments where the update was unsuccessful, the message 330 includes information, such as an error code, which indicates a reason why the update of the list failed.

In message 335, the MME 130 transmits a DNS query to the DNS 140. The DNS query requests a list of nodes for the MME 130 to provide to the UE, e.g., UE 102 (FIG. 1), for connecting the UE to the network. In some embodiments, the message 335 is transmitted automatically in response to the MME 130 receiving a connection request from a UE, such as UE 102 (FIG. 1). In some embodiments, the message 335 is transmitted periodically to allow the MME 130 to maintain an up to date listing of available nodes to facilitate faster connection of UEs in a future connection request. In some embodiments, the message 335 is transmitted in response to the MME 130 receiving an instruction from the network operator, such as in response to hardware or software updates to a base station, a data center, or a cluster; restoration of power to a base station, a data center, or a cluster; or other suitable occurrences.

In operation 340, the DNS 140 retrieves the preclusion list or the list of available nodes. As discussed above, in some embodiments, the DNS 140 maintains a preclusion list indicating which nodes are in a faulty status. This preclusion list is usable to inform the MME 130 which nodes to avoid attempting to connect with the UE, e.g., UE 102 (FIG. 1). In some embodiments, the DNS 140 maintains a list of connectable nodes, which is usable to inform the MME 130 which nodes the MME 130 should attempt to connect with the UE, e.g., UE 102 (FIG. 1). Either type of list helps to improve the odds of successfully establishing a connection between the UE and the node in comparison with other approaches.

In message 345, the DNS 140 transmits a DNS response to the MME 130. The DNS response informs the MME 130 regarding which nodes are available for connection. In some embodiments, the message 345 includes acknowledgement of the request as well as the node list. In some embodiments where the query was unsuccessful, the message 345 includes information, such as an error code, which indicates a reason why the query failed.

Utilizing the communication 300, the MME 130 is able to accurately and precisely determine which nodes are available to be assigned to the UE, such as UE 102 (FIG. 1). This allows the MME 130 to provide accurate data to the UE for connecting to the network. The improved accuracy of the data provided to the UE increases the odds of the UE successfully and reliably connecting to the network; and helps to maintain user satisfaction with the network. Additionally, the ability to automatically transfer node information between the NRF 120 and the DNS 140 helps avoid situations where manual invention is relied upon to update the list in the DNS 140, in comparison with other approaches. Other approaches that include manual updating of the list in the DNS 140 have an increased risk of user dissatisfaction because a risk of inaccurate or outdated information being in the list in the DNS 140 increases. For example, in a situation where a node goes off-line or becomes faulty, e.g., due to a power outage, the network operator is likely to be tasked with restoration of the node to proper operation. As a result, the network operator will have an increased risk of delaying updating of the list in the DNS 140, which, in turn, increases the odds of the MME 130 attempting to connect a UE to that faulty node. Further, a risk of the network operator incorrectly entering data into the list in the DNS 140 is higher than the automatic updating of the list that is accomplished using the communication 300.

Figure 4:
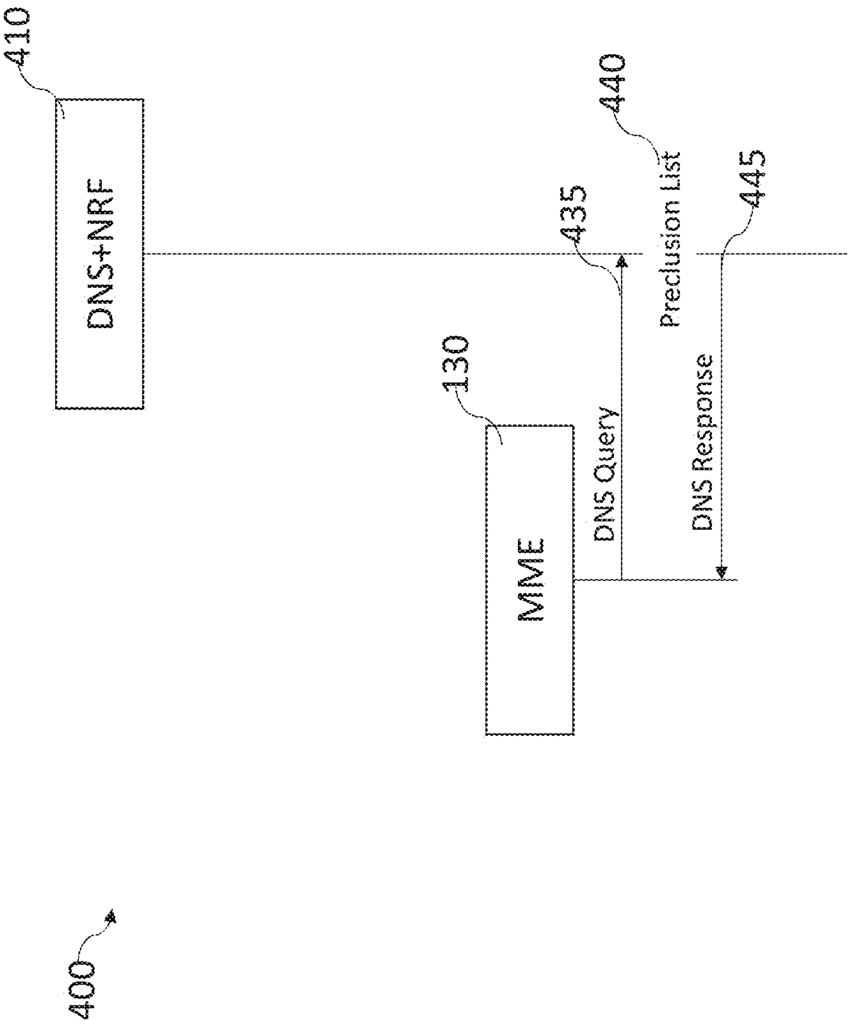
FIG. 4 is a sequence diagram of communication between components of a multi-generation network equipment in accordance with some embodiments.

FIG. 4 is a sequence diagram of communication 400 between components of a multi-generation network equipment in accordance with some embodiments. The communication 400 is between an integrated DNS+NRF 410 and the MME 130. While the reference numbers refer to components of the multi-generation network equipment 100 (FIG. 1), one of ordinary skill in the art would understand that features of the communication 400 are not limited to solely to the multi-generation network equipment 100 (FIG. 1). In comparison with the communication 300 (FIG. 3), the communication 400 utilizes an integrated DNS and NRF. That is, the DNS 140 and the NRF 120 of the communication 300 are implemented in a single device. Processing and storing of information within the single DNS+NRF 410 is similar to that discussed above with respect to the communication 300 (FIG. 3); however, messages are not transmitted between separate devices. In some embodiments, the messages of the communication 400 are transmitted via a wired connection. In some embodiments, at least one message of the communication 400 is transmitted wirelessly.

In message 435, the MME 130 transmits a DNS query to the DNS+NRF 410. The DNS query requests a list of nodes for the MME 130 to provide to the UE, e.g., UE 102 (FIG. 1), for connecting the UE to the network. In some embodiments, the message 435 is transmitted automatically in response to the MME 130 receiving a connection request from a UE, such as UE 102 (FIG. 1). In some embodiments, the message 435 is transmitted periodically to allow the MME 130 to maintain an up to date listing of available nodes to facilitate faster connection of UEs in a future connection request. In some embodiments, the message 435 is transmitted in response to the MME 130 receiving an instruction from the network operator, such as in response to hardware or software updates to a base station, a data center or a cluster; restoration of power to a base station, a data center, or a cluster; or other suitable occurrences.

In operation 440, the DNS+NRF 410 retrieves the preclusion list or the list of available nodes. In some embodiments, the DNS+NRF 410 maintains a preclusion list indicating which nodes are in a faulty status. This preclusion list is usable to inform the MME 130 which nodes to avoid attempting to connect with the UE, e.g., UE 102 (FIG. 1). In some embodiments, the DNS+NRF 410 maintains a list of connectable nodes, which is usable to inform the MME 130 which nodes the MME 130 should attempt to connect with the UE, e.g., UE 102 (FIG. 1). Either type of list helps to improve the odds of successfully establishing a connection between the UE and the node in comparison with other approaches.

In message 445, the DNS+NRF 410 transmits a DNS response to the MME 130. The DNS response informs the MME 130 regarding which nodes are available for connection. In some embodiments, the message 445 includes acknowledgement of the request as well as the node list. In some embodiments where the query was unsuccessful, the message 445 includes information, such as an error code, which indicates a reason why the query failed.

Utilizing the communication 400, the MME 130 is able to accurately and precisely determine which nodes are available to be assigned to the UE, such as UE 102 (FIG. 1). This allows the MME 130 to provide accurate data to the UE for connecting to the network. The improved accuracy of the data provided to the UE increases the odds of the UE successfully and reliably connecting to the network; and helps to maintain user satisfaction with the network. Additionally, the ability to automatically process and store the information in the DNS+NRF 410 helps avoid situations where manual invention is relied upon to update the list in the DNS 140, in comparison with other approaches. Other approaches that include manual updating of the list in the DNS have an increased risk of user dissatisfaction because a risk of inaccurate or outdated information being in the list in the DNS increases, as discussed above.

Figure 5:
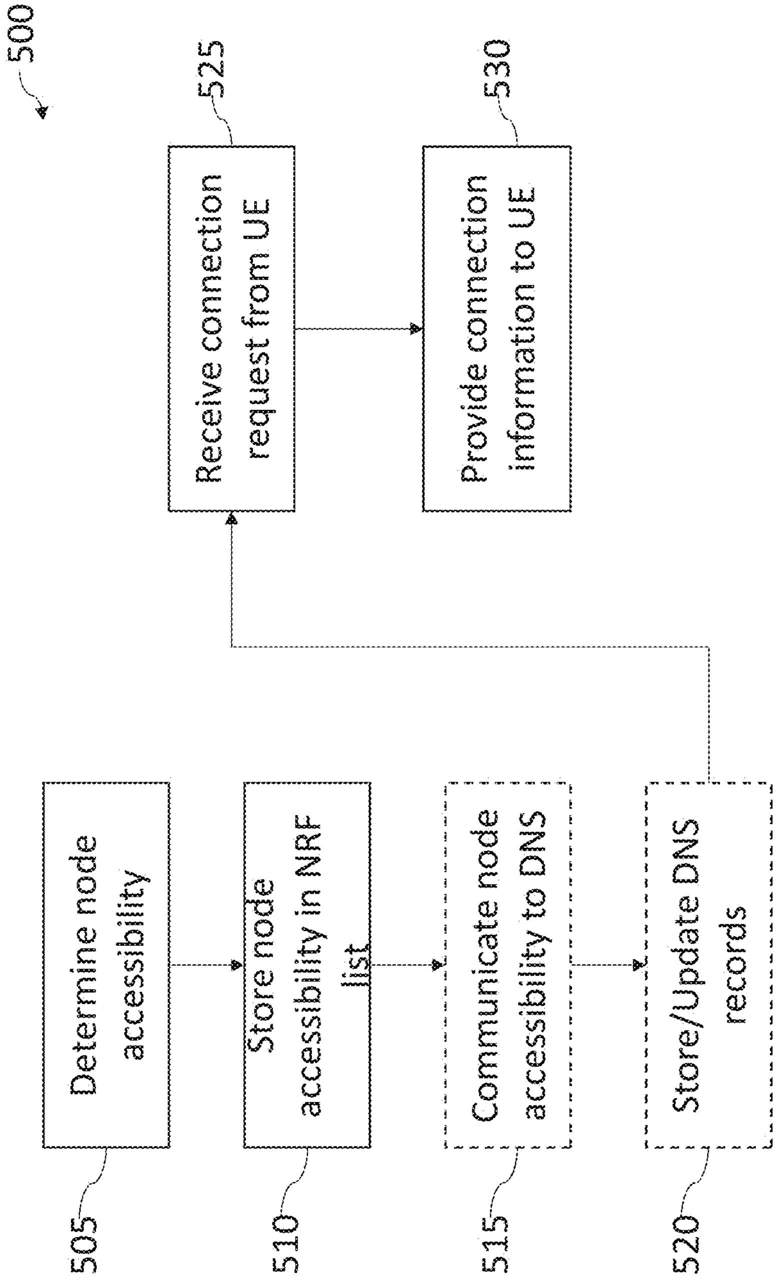
FIG. 5 is a flowchart of a method of selecting a node for connection to user equipment (UE) in accordance with some embodiments.
Figure 6:
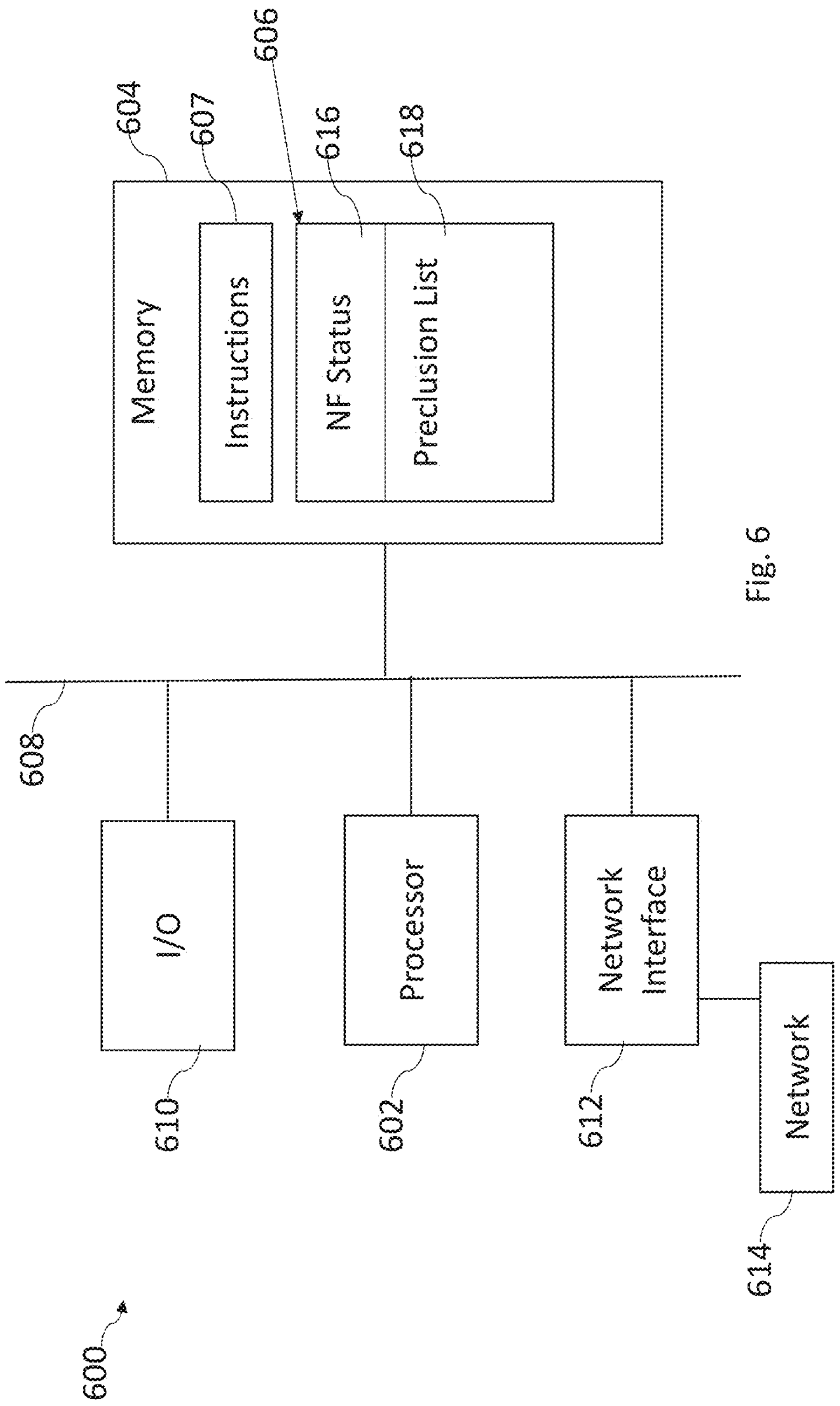
FIG. 6 is a block diagram of a system for selecting a node for connection to UE in accordance with some embodiments.

FIG. 5 is a flowchart of a method 500 of selecting a node for connection to user equipment (UE) in accordance with some embodiments. For the sake of clarity, the following description refers to reference numbers of the multi-generation network equipment 100 (FIG. 1), the communication 200 (FIG. 2), the communication 300 (FIG. 3), or the communication 400 (FIG. 4). However, one of ordinary skill in the art would understand that method 500 is not limited to these examples. In some embodiments, at least a portion of the method 500 is implemented using the multi-generation network equipment 100 (FIG. 1) or the system 600 (FIG. 6). In some embodiments, the method 500 is implemented using one or more devices other than the multi-generation network equipment 100 (FIG. 1) or the system (FIG. 6). In some embodiments, at least a portion of the method 500 is implemented through communication 200 (FIG. 2), communication 300 (FIG. 3) or communication 400 (FIG. 4). In some embodiments, the method 500 is implemented using a communication process other than communication 200 (FIG. 2), communication 300 (FIG. 3) or communication 400 (FIG. 4).

In operation 505, node accessibility is determined. The node accessibility includes information related to a status of the node to receive a connection to a UE. In some embodiments, the node accessibility is determined based on registration of the node, e.g., using message 205 (FIG. 2). In some embodiments, the node accessibility is determined based on updated information about the node, e.g., using message 215 (FIG. 2). In some embodiments, the node accessibility is determined based on one or more of scenarios 230, 240 or 250 (FIG. 2). In some embodiments, the node accessibility is determined based on an input to the NRF 120 (FIG. 1) received from a network operator.

In operation 510, the node accessibility is stored in the NRF 120 (FIG. 1). The NRF 120 (FIG. 1) stores the node information along with a status of the node, which indicates whether the node is accessibility for connection to a UE, e.g., UE 102 (FIG. 1). In some embodiments, the status is stored in a memory, such as memory 640 (FIG. 6). In some embodiments, the operation 510 includes updating a status of a node stored in the NRF 120 (FIG. 1). In some embodiments, the operation 510 includes removal of a node stored in the NRF 120 (FIG. 1), e.g., due to scenario 250 (FIG. 2).

In operation 515, the node accessibility is communicated to DNS 140 (FIG. 1). In some embodiments, the node accessibility is communicated to DNS 140 (FIG. 1) using messages described with respect to communication 300 (FIG. 3). In some embodiments, the operation 515 is omitted. In some embodiments, the operation 515 is omitted when the DNS 140 (FIG. 1) and the NRF 120 (FIG. 1) are integrated into a single device, such as DNS+NRF 410 (FIG. 4).

In operation 520, the node accessibility is used to store information or update information in a list stored in the DNS 140 (FIG. 1). In some embodiments, the storing or updating of the list in the DNS 140 (FIG. 1) is implemented using communication 300 (FIG. 3). In some embodiments, the operation 520 is omitted. In some embodiments, the operation 520 is omitted when the DNS 140 (FIG. 1) and the NRF 120 (FIG. 1) are integrated into a single device, such as DNS+NRF 410 (FIG. 4). In some embodiments, wherein the DNS+NRF 410 is used, the operation 520 is combined with the operation 510.

In operation 525, a connection request is received from a UE. The UE, e.g., UE 102 (FIG. 1), provides a connection request to either the AMF 110 (FIG. 1) or the MME 130 (FIG. 1) based on a technology which the UE uses to communicate with the network. In some embodiments, the UE uses 5G to communicate with the network and the connection request is received by the AMF 110 (FIG. 1). In response to the connection request, the AMF 110 utilizes information received from the NRF 120 (FIG. 1) to determine which nodes are available for connection with the UE. In some embodiments, the AMF 110 determines which nodes are available for connection with the UE using communication 200 (FIG. 2).

In some embodiments, the UE uses 4G to communicate with the network and the connection request is received by the MME 130 (FIG. 1). In response to the connection request, the MME 130 utilizes information received from the DNS 140 (FIG. 1) to determine which nodes are available for connection with the UE. In some embodiments, the MME 130 determines which nodes are available for connection with the UE using communication 300 (FIG. 3) or communication 400 (FIG. 4).

In operation 530, connection information is provided to the UE. In some embodiments, the connection information is provided to the UE, e.g., UE 102 (FIG. 1), by the MME 130 (FIG. 1) or the AMF 110 (FIG. 1). In some embodiments, the connection information is provided to the UE based on information received from the NRF 120 (FIG. 1). In some embodiments, the connection information is provided to the UE based on information received from the DNS 140 (FIG. 1).

One of ordinary skill in the art would understand that modifications to the method 500 are within the scope of this description. In some embodiments, at least one operation is added to the method 500. For example, in some embodiments, the method 500 further includes addition of a new node to the network. In some embodiments, at least one operation is omitted from the method 500. For example, in some embodiments, the operation 515 is omitted from the method 500. In some embodiments, an order of operations of the method 500 is adjusted. For example, in some embodiments, the operations 510 and 520 are performed simultaneously.

FIG. 6 is a block diagram of a system 600 for selecting a node for connection to UE in accordance with some embodiments. System 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with external devices. The processor 602 is electrically coupled to the computer readable storage medium 604 via a bus 608. The processor 602 is also electrically coupled to an input/output (I/O) interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in multi-generation network equipment 100 (FIG. 1), communication 200 (FIG. 2), communication 300 (FIG. 3), communication 400 (FIG. 4), or method 500 (FIG. 5).

In some embodiments, the processor 602 is a central processing unit (CPU), a multi-processor, a distributed processing system, an application specific integrated circuit (ASIC), and/or a suitable processing unit.

In some embodiments, the computer readable storage medium 604 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD).

In some embodiments, the storage medium 604 stores the computer program code 606 configured to cause system 600 to perform a portion or all of the operations as described in multi-generation network equipment 100 (FIG. 1), communication 200 (FIG. 2), communication 300 (FIG. 3), communication 400 (FIG. 4), or method 500 (FIG. 5). In some embodiments, the storage medium 604 also stores information used for performing a portion or all of the operations as described in multi-generation network equipment 100 (FIG. 1), communication 200 (FIG. 2), communication 300 (FIG. 3), communication 400 (FIG. 4), or method 500 (FIG. 5) as well as information generated during performing the a portion or all of the operations as described in multi-generation network equipment 100 (FIG. 1), communication 200 (FIG. 2), communication 300 (FIG. 3), communication 400 (FIG. 4), or method 500 (FIG. 5), such as a NF status parameter 616, and a preclusion list parameter 618 and/or a set of executable instructions to perform the operation of a portion or all of the operations as described in multi-generation network equipment 100 (FIG. 1), communication 200 (FIG. 2), communication 300 (FIG. 3), communication 400 (FIG. 4), or method 500 (FIG. 5).

In some embodiments, the storage medium 604 stores instructions 607 for interfacing with external devices. The instructions 607 enable processor 602 to generate instructions readable by the external devices to effectively implement a portion or all of the operations as described in multi-generation network equipment 100 (FIG. 1), communication 200 (FIG. 2), communication 300 (FIG. 3), communication 400 (FIG. 4), or method 500 (FIG. 5).

System 600 includes I/O interface 610. I/O interface 610 is coupled to external circuitry. In some embodiments, I/O interface 610 includes a keyboard, keypad, mouse, trackball, trackpad, and/or cursor direction keys for communicating information and commands to processor 602.

System 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in multi-generation network equipment 100 (FIG. 1), communication 200 (FIG. 2), communication 300 (FIG. 3), communication 400 (FIG. 4), or method 500 (FIG. 5) is implemented in two or more systems 600, and information such as NF status parameter 616 or preclusion list 618 are exchanged between different systems 600 via network 614.

The above description treats the SMF+PGW-C 160 (FIG. 1) as the node. However, one of ordinary skill in the art would recognize that this description is not limited to only using the SMF+PGW-C 160 as the node. In some embodiments, the AMF 110 is usable as a node. For example, in a 4G to 5G handover process, the communication 200 (FIG. 2), the communication 300 (FIG. 3) and/or the communication 400 (FIG. 4) are usable to update the MME 130 (FIG. 1) about available AMF 110 (FIG. 1) for establishing the connection between the UE, e.g., UE 102 (FIG. 1) and the AMF 110. One of ordinary skill in the art would understand that modifying the above description to include the AMF 110 (FIG. 1) as the node would include registering the AMF 110 with the NRF 120 (FIG. 2) and communicating status information about one or more AMF 110 to the DNS 140 (FIG. 1) in a manner similar to that described in communication 300 (FIG. 3) and/or communication 400 (FIG. 4).

Supplemental Note 1

A method of identifying accessible nodes for a wireless network includes storing a first list of nodes in a first device, wherein the first list includes a corresponding status of each of the nodes in the first list, and the first device usable in a first technology generation of the wireless network. The method further includes updating a second list of nodes in a second device based on the first list of nodes, wherein the second list is free of a status of each of the nodes of the second list, and the second device is usable in a second technology generation of the wireless network different from the first technology generation. The method further includes providing connection information for a node of the second list of nodes to user equipment in response to receiving a connection request from the user equipment.

Supplemental Note 2

The method of Supplemental Note 1, wherein the first technology generation includes fifth generation (5G), and the second technology generation includes fourth generation (4G).

Supplemental Note 3

The method of Supplemental Note 1, wherein updating the second list includes removing a node from the second list in response to the first list indicating a status of the node is faulty.

Supplemental Note 4

The method of Supplemental Note 1, wherein updating the second list includes adding a node to the second list in response to the first list indicating a status of the node is accessible and the node being absent from the second list.

Supplemental Note 5

The method of Supplemental Note 1, wherein the first device is separate from the second device.

Supplemental Note 6

The method of Supplemental Note 1, wherein the first device is integrated with the second device.

Supplemental Note 7

The method of Supplemental Note 1, wherein the first device includes a network repository function (NRF), and the second device includes a domain name system (DNS).

Supplemental Note 8

A system for identifying accessible nodes for a wireless network includes a non-transitory computer readable medium configured to store instructions thereon. The system further includes a processor connected to the non-transitory computer readable medium. The processor is configured to execute the instructions for instructing the non-transitory computer readable medium to store a first list of nodes in a first device, wherein the first list includes a corresponding status of each of the nodes in the first list, and the first device usable in a first technology generation of the wireless network. The processor is further configured to execute the instructions for updating a second list of nodes in a second device based on the first list of nodes, wherein the second list is free of a status of each of the nodes of the second list, and the second device is usable in a second technology generation of the wireless network different from the first technology generation. The processor is further configured to execute the instructions for providing connection information for a node of the second list of nodes to user equipment in response to receiving a connection request from the user equipment.

Supplemental Note 9

The system of Supplemental Note 8, wherein the first technology generation includes fifth generation (5G), and the second technology generation includes fourth generation (4G).

Supplemental Note 10

The system of Supplemental Note 8, wherein the processor is configured to execute the instructions for updating the second list by removing a node from the second list in response to the first list indicating a status of the node is faulty.

Supplemental Note 11

The system of Supplemental Note 8, wherein the processor is configured to execute the instructions for updating the second list by adding a node to the second list in response to the first list indicating a status of the node is accessible and the node being absent from the second list.

Supplemental Note 12

The system of Supplemental Note 8, wherein the first device is separate from the second device.

Supplemental Note 13

The system of Supplemental Note 8, wherein the first device is integrated with the second device.

Supplemental Note 14

The system of Supplemental Note 8, wherein the first device includes a network repository function (NRF), and the second device includes a domain name system (DNS).

Supplemental Note 15

A non-transitory computer readable medium configured to store instructions thereon for causing a processor to instruct the non-transitory computer readable medium to store a first list of nodes in a first device, wherein the first list includes a corresponding status of each of the nodes in the first list, and the first device usable in a first technology generation of the wireless network. The instructions are further configured to cause the processor to update a second list of nodes in a second device based on the first list of nodes, wherein the second list is free of a status of each of the nodes of the second list, and the second device is usable in a second technology generation of the wireless network different from the first technology generation. The instructions are further configured to cause the processor to provide connection information for a node of the second list of nodes to user equipment in response to receiving a connection request from the user equipment.

Supplemental Note 16

The non-transitory computer readable medium of Supplemental Note 15, wherein the first technology generation includes fifth generation (5G), and the second technology generation includes fourth generation (4G).

Supplemental Note 17

The non-transitory computer readable medium of Supplemental Note 15, wherein the instructions are further configured to cause the processor to update the second list by removing a node from the second list in response to the first list indicating a status of the node is faulty.

Supplemental Note 18

The non-transitory computer readable medium of Supplemental Note 15, wherein the instructions are further configured to cause the processor to update the second list by adding a node to the second list in response to the first list indicating a status of the node is accessible and the node being absent from the second list.

Supplemental Note 19

The non-transitory computer readable medium of Supplemental Note 15, wherein the first device is separate from the second device.

Supplemental Note 20

The non-transitory computer readable medium of Supplemental Note 15, wherein the first device is integrated with the second device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of identifying accessible nodes for a wireless network, the method comprising:

storing a first list of nodes in a first device, wherein the first list comprises a corresponding status of each of the nodes in the first list, and the first device usable in a first technology generation of the wireless network;

updating a second list of nodes in a second device based on the first list of nodes in response to the second device subscribing to the first device for status updates of the nodes, wherein the second list is free of a status of each of the nodes of the second list, and the second device is usable in a second technology generation of the wireless network different from the first technology generation; and providing connection information for a node of the second list of nodes to user equipment in response to receiving a connection request from the user equipment.

2. The method of claim 1, wherein the first technology generation comprises fifth generation (5G), and the second technology generation comprises fourth generation (4G).

3. The method of claim 1, wherein updating the second list comprises removing a node from the second list in response to the first list indicating a status of the node is faulty.

4. The method of claim 1, wherein updating the second list comprises adding a node to the second list in response to the first list indicating a status of the node is accessible and the node being absent from the second list.

5. The method of claim 1, wherein the first device is separate from the second device.

6. The method of claim 1, wherein the first device is integrated with the second device.

7. The method of claim 1, wherein the first device comprises a network repository function (NRF), and the second device comprises a domain name system (DNS).

8. A system for identifying accessible nodes for a wireless network, the system comprising:

a non-transitory computer readable medium configured to store instructions thereon; and a processor connected to the non-transitory computer readable medium, wherein the processor is configured to execute the instructions for:

instructing the non-transitory computer readable medium to store a first list of nodes in a first device, wherein the first list comprises a corresponding status of each of the nodes in the first list, and the first device usable in a first technology generation of the wireless network;

updating a second list of nodes in a second device based on the first list of nodes in response to the second device subscribing to the first device for status updates of the nodes, wherein the second list is free of a status of each of the nodes of the second list, and the second device is usable in a second technology generation of the wireless network different from the first technology generation; and providing connection information for a node of the second list of nodes to user equipment in response to receiving a connection request from the user equipment.

9. The system of claim 8, wherein the first technology generation comprises fifth generation (5G), and the second technology generation comprises fourth generation (4G).

10. The system of claim 8, wherein the processor is configured to execute the instructions for updating the second list by removing a node from the second list in response to the first list indicating a status of the node is faulty.

11. The system of claim 8, wherein the processor is configured to execute the instructions for updating the second list by adding a node to the second list in response to the first list indicating a status of the node is accessible and the node being absent from the second list.

12. The system of claim 8, wherein the first device is separate from the second device.

13. The system of claim 8, wherein the first device is integrated with the second device.

14. The system of claim 8, wherein the first device comprises a network repository function (NRF), and the second device comprises a domain name system (DNS).

15. A non-transitory computer readable medium configured to store instructions thereon for causing a processor to:

instruct the non-transitory computer readable medium to store a first list of nodes in a first device, wherein the first list comprises a corresponding status of each of the nodes in the first list, and the first device usable in a first technology generation of the wireless network;

update a second list of nodes in a second device based on the first list of nodes in response to the second device subscribing to the first device for status updates of the nodes, wherein the second list is free of a status of each of the nodes of the second list, and the second device is usable in a second technology generation of the wireless network different from the first technology generation; and provide connection information for a node of the second list of nodes to user equipment in response to receiving a connection request from the user equipment.

16. The non-transitory computer readable medium of claim 15, wherein the first technology generation comprises fifth generation (5G), and the second technology generation comprises fourth generation (4G).

17. The non-transitory computer readable medium of claim 15, wherein the instructions are further configured to cause the processor to update the second list by removing a node from the second list in response to the first list indicating a status of the node is faulty.

18. The non-transitory computer readable medium of claim 15, wherein the instructions are further configured to cause the processor to update the second list by adding a node to the second list in response to the first list indicating a status of the node is accessible and the node being absent from the second list.

19. The non-transitory computer readable medium of claim 15, wherein the first device is separate from the second device.

20. The non-transitory computer readable medium of claim 15, wherein the first device is integrated with the second device.

* * * * *